United States Patent
Asada et al.

(10) Patent No.: US 8,826,716 B2
(45) Date of Patent: Sep. 9, 2014

(54) ELECTROMAGNETIC FLOW RATE MEASUREMENT SYSTEM AND CALIBRATOR THEREFOR

(75) Inventors: Takatoshi Asada, Kanagawa (JP); Daigo Kittaka, Kanagawa (JP); Yasuko Oyamatsu, Ibaraki (JP); Masafumi Komai, Kanagawa (JP); Hiroyuki Oota, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 13/218,063

(22) Filed: Aug. 25, 2011

(65) Prior Publication Data

US 2012/0047987 A1    Mar. 1, 2012

(30) Foreign Application Priority Data

Aug. 30, 2010    (JP) ................. 2010-192718

(51) Int. Cl.
  *G01F 25/00* (2006.01)
  *G01F 1/58* (2006.01)
(52) U.S. Cl.
  CPC ............ *G01F 1/588* (2013.01); *G01F 25/0007* (2013.01)
  USPC .......................................................... 73/1.16
(58) Field of Classification Search
  CPC ............................... G01F 1/588; G01F 25/0007
  USPC ..................................................... 73/861.12
  See application file for complete search history.

(56) References Cited

U.S. PATENT DOCUMENTS

| | | | | |
|---|---|---|---|---|
| 4,736,635 A * | 4/1988 | Murase | ...... | 73/861.15 |
| 5,263,374 A * | 11/1993 | Marsh | ...... | 73/861.15 |
| 6,085,599 A * | 7/2000 | Feller | ...... | 73/861.13 |
| 6,431,011 B1 * | 8/2002 | Feller | ...... | 73/861.12 |
| 6,463,807 B1 * | 10/2002 | Feller | ...... | 73/861.12 |
| 7,267,012 B2 | 9/2007 | Ara et al. | | |
| 7,673,524 B2 * | 3/2010 | Bailey et al. | ...... | 73/861.17 |
| 7,895,903 B2 * | 3/2011 | Bailey et al. | ...... | 73/861.17 |
| 2007/0022824 A1 * | 2/2007 | Bailey et al. | ...... | 73/861.17 |
| 2007/0034015 A1 * | 2/2007 | Ara et al. | ...... | 73/861.12 |

FOREIGN PATENT DOCUMENTS

| | | |
|---|---|---|
| CA | 1290594 | 10/1991 |
| JP | 56-142413 A | 11/1981 |
| JP | 62-189910 A | 8/1987 |
| JP | 02-213723 A | 8/1990 |
| JP | 2007-047071 A | 2/2007 |

* cited by examiner

*Primary Examiner* — Hezron E Williams
*Assistant Examiner* — Mark A Shabman
(74) *Attorney, Agent, or Firm* — Foley & Lardner LLP

(57) ABSTRACT

One embodiment of an electromagnetic flow rate measurement system includes electromagnetic flowmeters arranged at intervals from one another in the peripheral direction of an annular flow passage 1 in which an electric conductive fluid flows. Each of the electromagnetic flowmeters comprises: an excitation member that has magnets arranged at intervals from one another in the outer peripheral surface of the annular flow passage so as to form a magnetic field in the direction perpendicular to the outer peripheral surface of the annular flow passage; and electrodes that are provided between the magnets of the excitation member and between the magnets of the excitation member so as to measure voltage generated when the electric conductive fluid crosses the magnetic field. The polarities of the magnets at the end portions of the closest excitation members of the adjacent electromagnetic flowmeters are opposed to each other.

9 Claims, 4 Drawing Sheets

ELECTROMAGNETIC FLOW RATE MEASUREMENT SYSTEM AND CALIBRATOR THEREFOR

CROSS REFERENCES TO RELATED APPLICATION

This application is based upon and claims the benefit of priority from Japanese Patent Application No. 2010-192718, filed an Aug. 30, 2010, the entire content of which is incorporated herein by reference.

FIELD

Embodiments described herein relate generally to an electromagnetic flow rate measurement system for measuring the flow rate of an electric conductive fluid such as a liquid metal flowing through a large-diameter pipeline like a fast reactor core or piping and a calibrator therefor.

BACKGROUND

There is known an electromagnetic flowmeter capable of measuring the flow rate of a fluid flowing through flow passages of various shapes such as an annular flow passage. As such an electromagnetic flowmeter, there is available a technique disclosed in Japanese Patent Application Laid-Open Publication No. 2007.47071 (Patent Document 1). In the technique disclosed in Patent Document 1, both magnetic poles of a magnetic field generator are arranged on one side of the outer wall of an annular flow passage.

More specifically, in the technique disclosed in Patent Document 1, there are provided an excitation device for forming a magnetic field perpendicular to a pipeline outer wall and a pair of electrodes for measuring an electromotive force generated when an electric conductive fluid crosses the magnetic field, and the pair of electrodes and both magnetic poles of the excitation device are arranged only on one side of the pipeline outer wall.

In the above technique disclosed in Patent Document 1, the pair of electrodes and both magnetic poles of the excitation device are arranged only on one side of the pipeline outer wall, so that the flow rate of a fluid flowing through a small (small-diameter) annular flow passage can be measured, while a number of flowmeters need to be provided on the pipeline outer wall in order to measure a fluid flowing through a large (large-diameter) annular flow passage.

In this case, the larger the size of the annular flow passage of the actual equipment, the larger the size of facility for calibration becomes, resulting in an increase of cost.

The present invention has been made in view of the above situation, and an object thereof is to provide an electromagnetic flow rate measurement system capable of performing calibration even for a large annular flow passage by means of a small-scale calibrator and the calibrator therefor.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

According to one embodiment, an electromagnetic flow rate measurement system includes a plurality of electromagnetic flowmeters arranged at intervals from one another in the peripheral direction of an annular flow passage in which an electric conductive fluid flows. Each of the electromagnetic flowmeters includes an excitation member that has a plurality of magnets arranged at intervals from one another along the outer peripheral surface of the annular flow passage in which the electric conductive fluid flows so as to form a magnetic field in the direction perpendicular to the outer peripheral surface of the annular flow passage, and a plurality of electrodes that are provided between the magnets of the excitation member so as to measure voltage generated when the electric conductive fluid crosses the magnetic field. The system has: polarities of the magnets at the end portions of the closest excitation members of the adjacent electromagnetic flowmeters that are opposed to each other.

Further, according to another embodiment, the system comprising: polarities of the magnets at the end portions of the closest excitation members of the adjacent electromagnetic flowmeters that are the same.

Hereinafter, embodiments of an electromagnetic flow rate measurement system according to the present invention and a calibrator therefor will be described below with reference to the accompanying drawings.

First Embodiment of System

Figure 1:
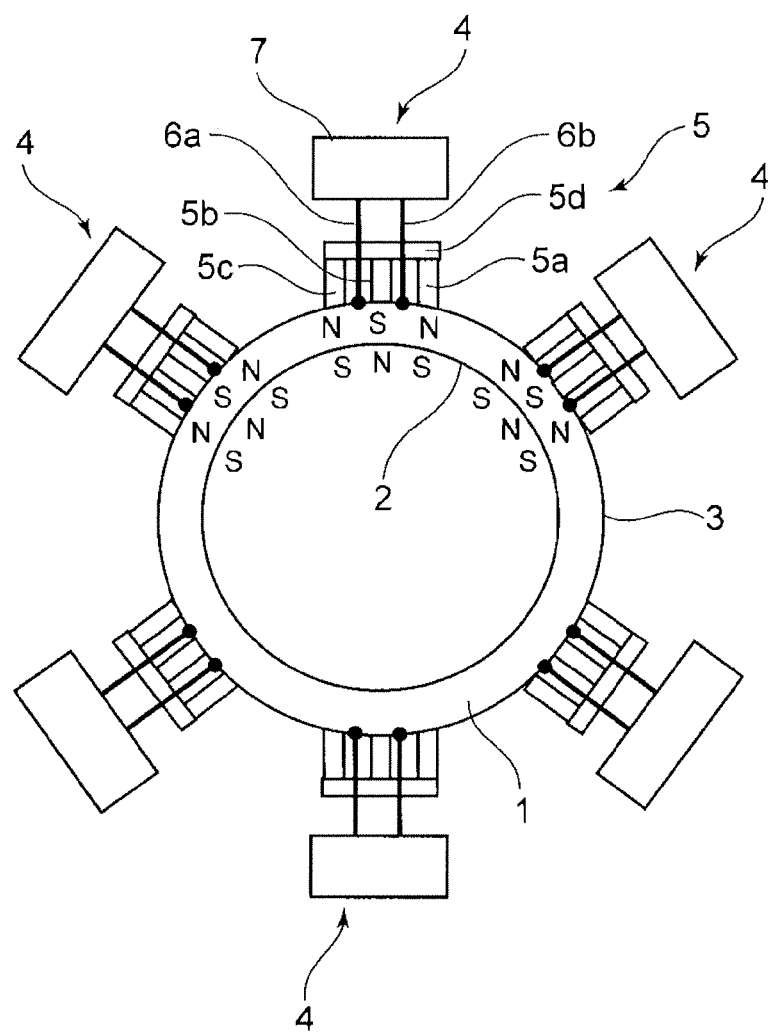
FIG. 1 is a cross-sectional configuration view illustrating a first embodiment of an electromagnetic flow rate measurement system according to the present invention.

FIG. 1 is a cross-sectional configuration view illustrating a first embodiment of an electromagnetic flow rate measurement system according to the present invention.

As illustrated in FIG. 1, an annular flow passage 1 is a large (large-diameter) pipeline having an annular cross section. Like a fast reactor core or piping, an electric conductive fluid such as liquid-metal sodium flows through the annular flow passage 1. The annular flow passage 1 is constituted by nonmagnetic inner and outer ducts 2 and 3. Six electromagnetic flowmeters 4 are arranged on the outer peripheral surface of the outer duct 3 in the peripheral direction at equal intervals. The number of electromagnetic flowmeters 4 arranged on the outer peripheral surface of the outer duct 3 is determined by a relationship between the length of the outer periphery of the annular flow passage 1 and the width of each of the electromagnetic flowmeters 4. In the present embodiment, six electromagnetic flowmeters 4 are arranged as illustrated in FIG. 1.

The electromagnetic flowmeters 4 each have an excitation member 5 for forming a magnetic field in the direction perpendicular to the axis line of the annular flow passage 1, a pair of electrodes 6a and 6b for measuring voltage (electromotive force) generated when the electric conductive fluid crosses the magnetic field, and a flow rate conversion processing circuit 7 for deriving a flow rate based on the voltage measured by the electrodes 6a and 6b.

The excitation member 5 has three electric magnets 5a, 5b, and 5c arranged at equal intervals, and the leading ends of the respective electric magnets 5a, 5b, and 5c contact the outer peripheral surface of the annular flow passage 1. The electrodes 6a and 6b are symmetrically arranged on both sides of the center electric magnet 5b. The other ends of the electric magnets 5a, 5b, and 5c are connected to one another by a connection portion 5d. Although not illustrated, exciting coils are wound around the electric magnets 5a, 5b, and 5c, respectively, and current flows in the exciting coils such that the polarity of a magnetic pole appearing at the leading end of the center electric magnet 5b and polarity of a magnetic pole appearing at the leading end of the left and right electric magnets 5a and 5c are opposed to each other.

That is, the electric magnets 5a, 5b, and 5c are arranged such that poles of opposite polarities (N and S poles) alternately appear at the outer peripheral surface of the outer duct 3. Further, in the present embodiment, the electric magnets 5a, 5b, and 5c are arranged such that the polarities of the electric magnets at the end portions of the closest excitation members 5 of the adjacent electromagnetic flowmeters 4 are the same.

For example, when the three electric magnets 5a, 5b, and 5c are arranged such that N, S, and N poles alternately appear, the polarities of the electric magnets 5a and 5c at the end portions of the closest excitation members 5 of the adjacent electromagnetic flowmeters 4 are N poles. Similarly, when the three electric magnets 5a, 5b, and 5c are arranged such that S, N, and S poles alternately appear, the polarities of the electric magnets 5a and 5c at the end portions of the closest excitation members 5 of the adjacent electromagnetic flowmeters 4 are S poles.

Although three electric magnets 5a, 5b, and 5c and a pair of electrodes 6a and 6b are provided in the present embodiment, the number of the electric magnets and the number of electrodes can arbitrarily be changed.

In each electromagnetic flowmeter 4 having the above configuration, when current is made to flow in each excitation coil, magnetic flux from the leading ends (N poles) of the left and right electric magnets 5a and 5c to the leading end (S pole) of the center electric magnet 5b occurs to form a synthetic magnetic field of a direction perpendicular to the outer duct 3 (radial direction of the annular flow passage 1) near the leading end of the center electric magnet 5b.

As a result, an electromotive force (voltage) corresponding to the flow velocity of an electric conductive fluid occurs in the electric conductive fluid near the leading end of the center electric magnet 5b in the direction perpendicular to both the magnetic field direction (radial direction of the annular flow passage 1) and conductive fluid flow direction (axial direction of the annular flow passage 1), i.e., direction of a line segment connecting the electrodes 6a and 6b, according to Faraday's law of electromagnetic induction. The electromotive force is taken out through the electrodes 6a and 6b, and the flow rate conversion processing circuit 7 calculates the flow rate or flow velocity of the electric conductive fluid based on the measurement value of the electromotive force.

As described above, the electromagnetic flow rate measurement system according to the present embodiment allows calibration of a calibrator described in the following embodiments to be applied thereto, as well as, allows the scale of the calibrator to be reduced.

Further, with the configuration in which the polarities of the electric magnets 5a and 5c at the end portions of the closest excitation members 5 of the adjacent electromagnetic flowmeters 4 are the same, the number of the electromagnetic flowmeters 4 arranged on the outer peripheral surface of the outer duct 3 can be determined regardless of whether it is even or odd, thereby obtaining a versatile system.

Second Embodiment of System

Figure 2:
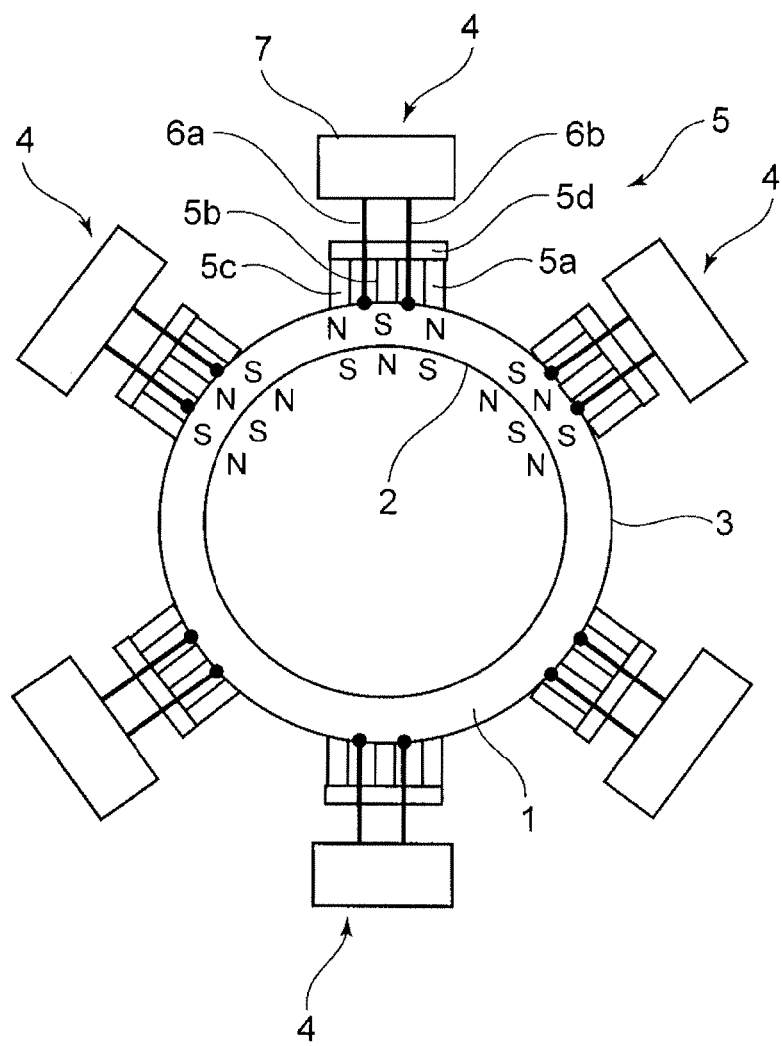
FIG. 2 is a cross-sectional configuration view illustrating a second embodiment of the electromagnetic flow rate measurement system according to the present invention.

FIG. 2 is a cross-sectional configuration view illustrating a second embodiment of the electromagnetic flow rate measurement system according to the present invention. In the following embodiments, the same reference numerals are given to the same components as those in the first embodiment and the overlapping description will be omitted.

As in the first embodiment, the electric magnets 5a, 5b, and 5c of the excitation member 5 of each electromagnetic flowmeter 4 are arranged at equal intervals in this order in the counterclockwise direction as viewed from the center of the annular flow passage 1. The same arrangement is adopted in the following embodiments.

As illustrated in FIG. 2, the electric magnets 5 constituting each electromagnetic flowmeter 4 are arranged such that the poles of opposite polarities (N and S poles) alternately appear along the outer peripheral surface of the outer duct 3. Further, in the present embodiment, the electric magnets 5a, 5b, and 5c are arranged such that the polarities of the electric magnets at the end portions of the closest excitation members 5 of the adjacent electromagnetic flowmeters 4 are opposite to each other.

For example, when the three electric magnets 5a, 5b, and 5c situated at equal intervals are arranged such that N, S, and N poles alternately appear, the polarities of the electric magnets 5a and 5c at the end portions of the closest excitation members 5 of the adjacent electromagnetic flowmeters 4 are S poles. Similarly, when the three electric magnets 5a, 5b, and 5c are arranged that S, N, and S poles alternately appear, the polarities of the electric magnets 5a and 5c at the end portions of the closest excitation members 5 of the adjacent electromagnetic flowmeters 4 are N poles.

The other feature in configuration and operation are the same as those of the first embodiment, and the descriptions thereof will be omitted.

As described above, the electromagnetic flow rate measurement system according to the present embodiment allows calibration of a calibrator described in the following embodiments to be applied thereto, as well as, allows the size of the calibrator to be reduced.

Further, with the configuration in which the polarities of the electric magnets 5a and 5c at the end portions of the closest excitation members 5 of the adjacent electromagnetic flowmeters 4 are opposite to each other, it is possible to minimize the mutual influence between the magnetic fields caused by the electric magnets 5a, 5b, and 5c and each electromagnetic flowmeter 4, as well as, mutual influence between inductive power generated from the electric conductive fluid and each electromagnetic flowmeter 4, thereby reducing the influence of one electromagnetic flowmeter 4 to another. This allows highly accurate flow rate measurement even in a large annular flow passage 1.

Third Embodiment of System

Figure 3:
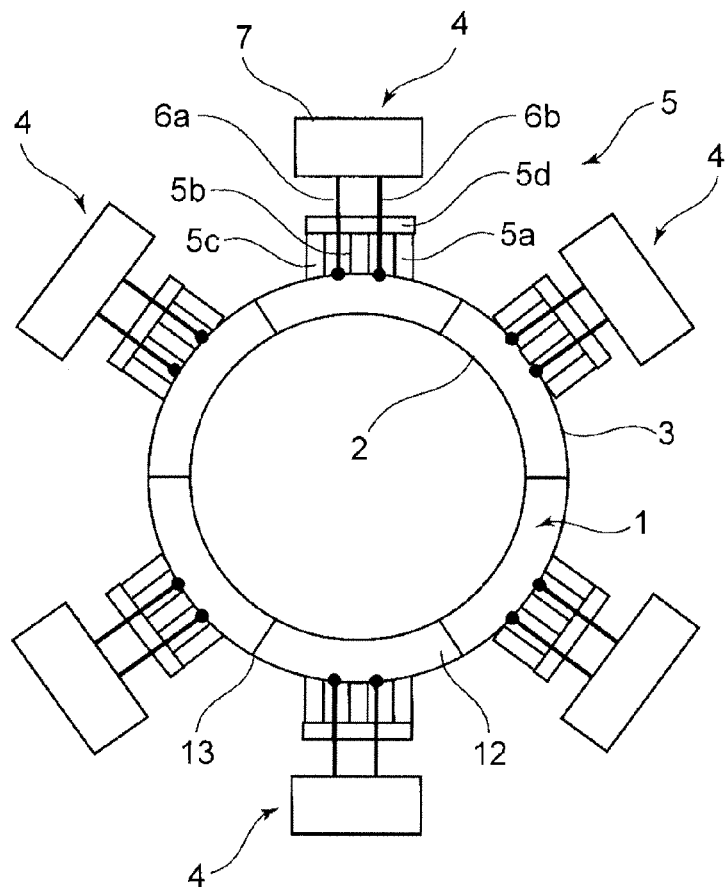
FIG. 3 is a cross-sectional configuration view illustrating a third embodiment of the electromagnetic flow rate measurement system according to the present invention.

FIG. 3 is a cross-sectional configuration view illustrating a third embodiment of the electromagnetic flow rate measurement system according to the present invention.

As illustrated in FIG. 3, in the present embodiment, six flow passage partition plates 13 are provided at equal intervals in the peripheral direction of the annular flow passage 1. By adopting the configuration in which the six flow passage partition plates 13 are provided so as to partition the annular flow passage 1, the annular flow passage 1 is made into six segmented annular flow passages 12. In these segmented annular flow passages 12, an electric conductive fluid such as liquid-metal sodium flows.

The six segmented annular flow passages 12 are formed by the flow passage partition plates 13 and non-magnetic inner and outer ducts 2 and 3. The electromagnetic flowmeter 4 is provided on the outer surface of the outer duct 3 of each segmented annular flow passage 12.

The electromagnetic flowmeters 4 each have the excitation member 5 for forming a magnetic field in the direction perpendicular to the axis line of the segmented annular flow passage 12, a pair of electrodes 6a and 6b for measuring voltage generated when the electric conductive fluid crosses the magnetic field, and flow rate conversion processing circuit 7 for deriving a flow rate based on the voltage measured by the electrodes 6a and 6b.

The excitation member 5 has the three electric magnets 5a, 5b, and 5c, and the leading ends thereof contact the outer peripheral surface of the annular flow passage 1. The electrodes 6a and 6b are symmetrically arranged on both sides of the center electric magnet 5b. The other ends of the electric magnets 5a, 5b, and 5c are connected to one another by the connection portion 5d.

The electric magnets 5a, 5b, and 5c constituting each electromagnetic flowmeter 4 are arranged such that poles of opposite polarities (N and S poles) alternately appear at the outer peripheral surface of the outer duct 3. Further, in the present embodiment, the electric magnets 5a, 5b, and 5c are arranged such that the polarities of the electric magnets at the end portions of the closest excitation members 5 of the adjacent electromagnetic flowmeters 4 are the same.

For example, when the three electric magnets 5a, 5b, and 5c are arranged such that N, S, and N poles alternately appear, the polarities of the electric magnets 5a and 5c at the end portions of the closest excitation members 5 of the adjacent electromagnetic flowmeters 4 are N poles. Similarly, when the three electric magnets 5a, 5b, and 5c are arranged that S, N, and S poles alternately appear, the polarities of the electric magnets 5a and 5c at the end portions of the closest excitation members 5 of the adjacent electromagnetic flowmeters 4 are S poles.

As described above, according to the present embodiment, the following advantage can be obtained. That is, when calibration is performed using a calibrator described in the following embodiments, the flow passage partition plates 13 each having a high electrical resistance are installed in the annular flow passage 1 allows the same flow condition and same induction magnetic field distribution as those at the time of calibration performed by a segment system of the calibrator to be obtained, thereby enhancing accuracy of the calibration in each segment.

Although three electric magnets 5a, 5b, and 5c and a pair of electrodes 6a and 6b are provided in the present embodiment, the number of the electric magnets of the excitation member 5 and the number of electrodes can arbitrarily be changed. Further, the number of the flow passage partition plates 13 for segmenting the annular flow passage 1 may be changed in accordance with the number of the electromagnetic flowmeters 4.

Further, although the electric magnets 5a, 5b, and 5c are arranged such that the polarities of the electric magnets at the end portions of the closest excitation members 5 of the adjacent electromagnetic flowmeters 4 are the same in the present embodiment, the electric magnets 5a, 5b, and 5c may be arranged such that the polarities of the electric magnets at the end portions of the closest excitation members 5 of the adjacent electromagnetic flowmeters 4 are opposite to each other.

For example, when the three electric magnets 5a, 5b, and 5c of FIG. 3 are arranged such that N, S, and N poles alternately appear, the polarities of the electric magnets 5a and 5c at the end portions of the closest excitation members 5 of the adjacent electromagnetic flowmeters 4 are S poles. Similarly, when the three electric magnets 5a, 5b, and 5c are arranged such that S, N, and S poles alternately appear, the polarities of the electric magnets 5a and 5c at the end portions of the closest excitation members 5 of the adjacent electromagnetic flowmeters 4 are N poles. Even in such a configuration, the same advantage as in the present embodiment can be obtained.

Next, embodiments of a calibrator for performing calibration of the electromagnetic flow rate measurement systems of the embodiments described above will be described. A calibrator described below can be applied to any of the first to third embodiments of the electromagnetic flow rate measurement system; however, for simplification, a case where the calibrator is applied to the first embodiment of the system will be described hereinafter.

First Embodiment of Calibrator

Figure 4:
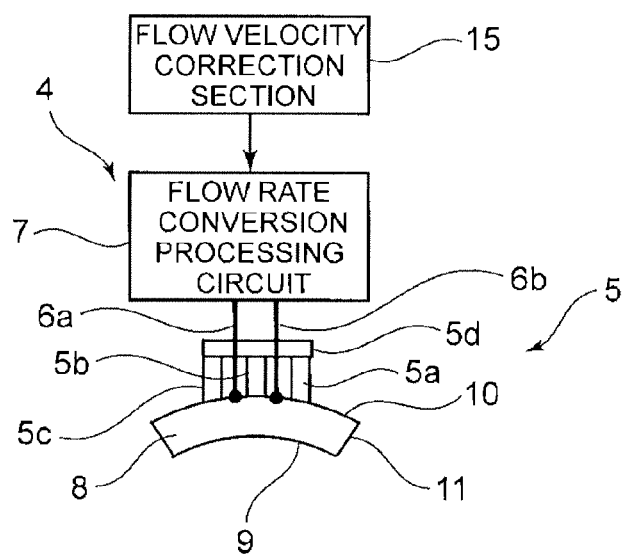
FIG. 4 is a cross-sectional configuration view illustrating a first embodiment of a calibrator for the electromagnetic flow rate measurement system according to the present invention.
Figure 5:
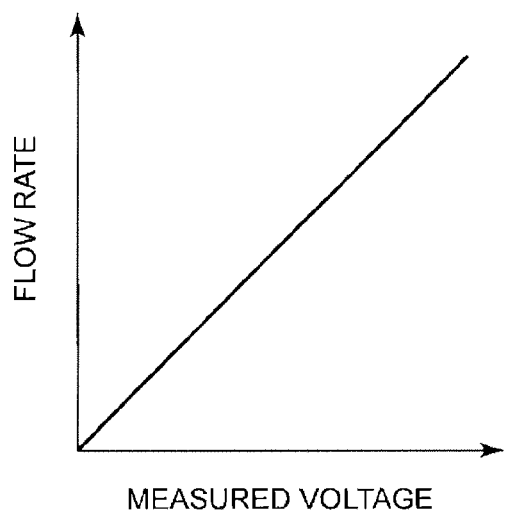
FIG. 5 is a view illustrating the relationship between a flow rate and a measured voltage obtained from the electromagnetic flow rate measurement system according to the present invention.

FIG. 4 is a cross-sectional configuration view illustrating a first embodiment of a calibrator for the electromagnetic flow rate measurement system according to the present invention. FIG. 5 is a view illustrating the relationship between a flow rate and a measured voltage obtained from the electromagnetic flow rate measurement system according to the present invention.

As illustrated in FIG. 4, a flow passage 8 in which the electric conductive fluid flows is a segmented flow passage for calibration corresponding to one of six segmented flow passages which are obtained by segmenting the annular flow passage 1 shown in FIG. 1 in the peripheral direction. The flow passage 8 is formed by an arc-like inner wall 9, an outer wall 10 formed concentrically with the inner wall 9 with a curvature larger than that of the inner wall 9, and peripheral end walls 11, 11 serving as side surfaces with respect to the inner and outer walls 9 and 10.

The electromagnetic flowmeter 4 for calibration is provided on the outer surface of the outer wall 10. As in the first embodiment, the electromagnetic flowmeter 4 includes the excitation member 5 having the electric magnets 5a, 5b, and 5c whose leading ends contact the outer surface of the outer wall 9 and other ends are connected to one another by the connection portion 5d, electrodes 6a and 6b symmetrically arranged on both sides of the center electric magnet 5b, and flow rate conversion processing circuit 7 for deriving a flow rate based on the voltage measured by the electrodes 6a and 6b.

In the above embodiments of the electromagnetic flow rate measurement system, the electromagnetic flow meters 4 arranged at equal intervals have the same configuration, so that the electromagnetic flowmeters 4 can be calibrated by the calibrator of the present embodiment, and calibration by facilities of a smaller scale than the actual electromagnetic flow rate measurement system can be realized.

The calibration mentioned here is a process in which a flowmeter for calibration whose accuracy has previously been determined is newly provided in the flow passage 8, a relationship between voltage measured by the electromagnetic flowmeter 4 and flow rate obtained by the flowmeter for calibration as a positive flow rate is calculated, and the calculated relationship is applied to the electromagnetic flowmeter 4 of the electromagnetic flow rate measurement system.

As the flowmeter for calibration, either the electromagnetic flowmeter or a flowmeter (e.g., ultrasonic flowmeter) may be used as long as the accuracy thereof has previously been determined. Further, if there is provided some sort of means for grasping the flow velocity of the fluid in the flow passage 8, the flowmeter for calibration need not be used. For example, if there is a mechanism for grasping the amount of fluid to be supplied to the flow passage 8 from the output of a pump for supplying the fluid, it can be used as a substitute for the flowmeter for calibration.

Although the flow passage 8 is one-sixth segment of the annular flow passage 1 in the present embodiment, the flow passage 8 may be one-second, one-third, or two-thirds segment of the annular flow passage 1.

Second Embodiment of Calibrator

Figure 6:
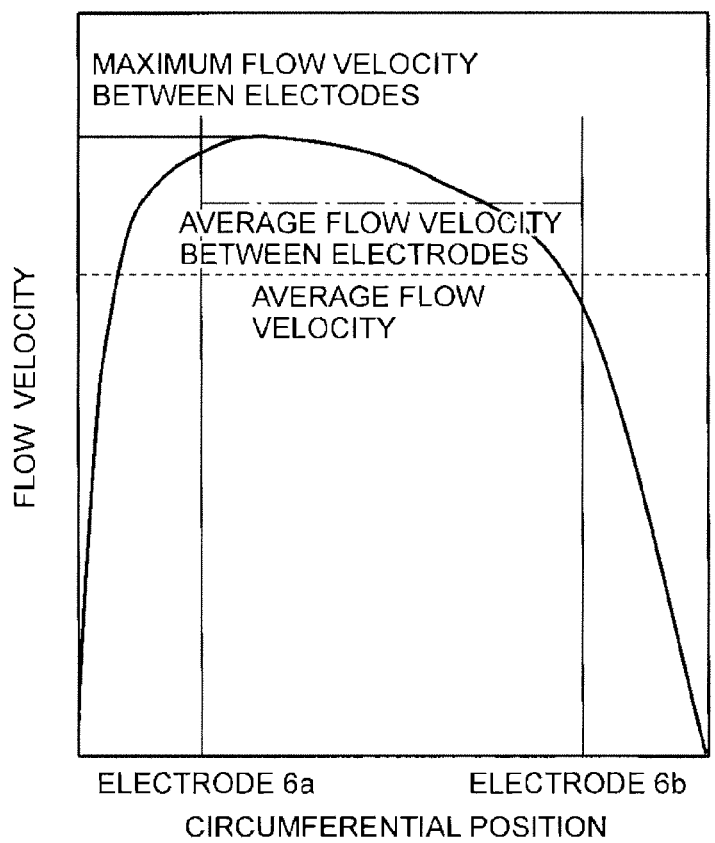
FIG. 6 is a view illustrating a flow velocity distribution in the peripheral direction used in a second embodiment of the calibrator for the electromagnetic flow rate measurement system according to the present invention.

FIG. 6 is a view illustrating a flow velocity distribution in the peripheral direction used in a second embodiment of the calibrator for the electromagnetic flow rate measurement system according to the present invention.

In the first embodiment of the calibrator illustrated in FIG. 4, the flow velocity is higher at the center of the flow passage 8 and lower near the peripheral end walls 11, 11 than the average flow velocity due to influence of the peripheral end walls 11, 11, as illustrated in FIG. 6.

In the present embodiment, in order to reduce influence of the flow velocity distribution, the flow velocity distribution is previously calculated by tests or numerical analysis, and then the relationship between the output of the electromagnetic flowmeter 4 and actual flow rate is calculated. More specifically, a flow velocity correction section 15 calculates a flow velocity correction coefficient from the average flow velocity or maximum flow velocity between the electrodes 6a and 6b and average flow velocity in the entire flow passage, and multiplies the calculated flow velocity correction coefficient when the voltage is converted into the flow rate in the flow rate conversion processing circuit 7.

As described above, according to the present embodiment, the flow velocity correction section 15 calculates the flow velocity correction coefficient from the average flow velocity or maximum flow velocity between the electrodes 6a and 6b and average flow velocity in the entire flow passage, and multiplies the calculated flow velocity correction coefficient when the voltage is converted into the flow rate, thereby correcting the flow velocity in each segmented flow passage 8 illustrated in FIG. 4 to a value close to the average flow velocity which is the proper flow velocity. Thus, the influence of the peripheral end walls 11, 11 on the flow velocity is reduced, so that, in addition to the effect obtained in the first embodiment of the calibrator, it is possible to significantly reduce an error between calibration for each segmented flow passage 8 and calibration for the annular flow passage 1.

The present invention is not limited to the embodiments described above, but various modifications may be made. Although the annular flow passage 1 having an annular cross section is used as the flow passage in the above embodiments, the present invention is not limited to this. For example, the flow passage may have other cross sections such as a rectangle.

The flow velocity correction coefficient may be calculated using an integral value of the flow velocity between the electrodes and integral value of the flow velocity in the entire flow passage.

Further, in the above respective embodiments, as the excitation device, a DC excitation system, a permanent magnet system, or an AC excitation system may be used.

Further, as the electric conductive fluid, any fluid such as liquid metal, electrolyte fluid such as water, or the like may be used as long as it has electric conductivity. However, in the case of using water, which has lower conductivity than that of the liquid metal, it is desirable to use, as an excitation system, an AC sine wave excitation system or an AC square wave excitation system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calibrator for an electromagnetic flow rate measurement system including a plurality of electromagnetic flowmeters arranged at intervals from one another in a peripheral direction of an annular flow passage in which an electric conductive fluid flows, the calibrator comprising:
    a flow passage for calibration corresponding to a part of the annular flow passage obtained by segmenting the annular flow passage in the peripheral direction; and
    an electromagnetic flowmeter for calibration provided in the flow passage for calibration, the electromagnetic flowmeter having:
        an excitation member for calibration that has a plurality of magnets for calibration arranged at intervals from one another along an outer peripheral surface of the annular flow passage in which the electric conductive fluid flows so as to form a magnetic field in a direction perpendicular to the outer peripheral surface of the annular flow passage; and
        a plurality of electrodes for calibration that are provided between the magnets of the excitation member so as to measure voltage generated when the electric conductive fluid crosses the magnetic field, wherein
    the calibrator is configured to calculate a relationship between voltage measured by the electromagnetic flowmeter for calibration and an amount of fluid flowing in the flow passage for calibration.

2. The calibrator for electromagnetic flow rate measurement system according to claim 1, wherein
    the calibrator uses a flow velocity distribution in the flow passage for calibration which is obtained to calculate a flow velocity correction coefficient which is a ratio between the flow velocity between electrodes of the electromagnetic flowmeter for calibration and the flow velocity in the entire flow passage for calibration and uses the calculated flow velocity correction coefficient to correct the relationship between voltage measured by the electromagnetic flowmeter for calibration and the amount of fluid flowing in the flow passage for calibration.

3. The calibrator for electromagnetic flow rate measurement system according to claim 2, wherein the flow velocity correction coefficient is calculated from an average flow velocity or a maximum flow velocity between the electrodes and an average flow velocity in the entire flow passage.

4. The calibrator for electromagnetic flow rate measurement system according to claim 1, wherein
polarities of the magnets at end portions of the closest excitation member of an adjacent electromagnetic flowmeter are opposed to each other.

5. The calibrator for electromagnetic flow rate measurement system according to claim 4, wherein
the calibrator uses a flow velocity distribution in the flow passage for calibration which is obtained to calculate a flow velocity correction coefficient which is a ratio between the flow velocity between velocity in the entire flow passage for calibration and uses the calculated flow velocity correction coefficient to correct the relationship between voltage measured by the electromagnetic flowmeter for calibration and the amount of fluid flowing in the flow passage for calibration.

6. The calibrator for electromagnetic flow rate measurement system according to claim 5, wherein
the flow velocity correction coefficient is calculated from an average flow velocity or a maximum flow velocity between the electrodes and an average flow velocity in the entire flow passage.

7. The calibrator for electromagnetic flow rate measurement system according to claim 1, wherein
polarities of the magnets at end portions of a closest excitation member of an adjacent electromagnetic flowmeter are the same.

8. The calibrator for electromagnetic flow rate measurement system according to claim 7, wherein
the calibrator uses a flow velocity distribution in the flow passage for calibration which is obtained to calculate a flow velocity correction coefficient which is a ratio between the flow velocity between electrodes of the electromagnetic flowmeter for calibration and the flow velocity in the entire flow passage for calibration and uses the calculated flow velocity correction coefficient to correct the relationship between voltage measured by the electromagnetic flowmeter for calibration and the amount of fluid flowing in the flow passage for calibration.

9. The calibrator for electromagnetic flow rate measurement system according to claim 8, wherein
the flow velocity correction coefficient is calculated from an average flow velocity or a maximum flow velocity between the electrodes and an average flow velocity in the entire flow passage.

* * * * *